United States Patent [19]

Kawai

[11] Patent Number: 4,955,107
[45] Date of Patent: Sep. 11, 1990

[54] SUCTION CLEANER

[75] Inventor: Yuzo Kawai, Nara, Japan

[73] Assignee: Kabushiki Kaisha Suiden, Osakashi, Japan

[21] Appl. No.: 222,748

[22] Filed: Jul. 22, 1988

[30] Foreign Application Priority Data

Mar. 2, 1988 [JP] Japan .................................. 63-50152

[51] Int. Cl.⁵ .............................................. A47L 5/24
[52] U.S. Cl. ....................................... 15/339; 15/330; 15/344; 15/405; 241/242
[58] Field of Search ................. 15/344, 339, 330, 405; 241/47, 57, 60, 166, 167, 242, 243

[56] References Cited

U.S. PATENT DOCUMENTS

| | | | |
|---|---|---|---|
| 1,527,818 | 2/1925 | O'Neill | 241/60 X |
| 2,733,000 | 1/1956 | Sparklin | 15/339 X |
| 3,968,938 | 7/1976 | Ruhl et al. | 15/330 X |
| 4,076,460 | 2/1978 | Roof | 15/330 X |
| 4,325,163 | 4/1982 | Mattson et al. | 15/330 |

Primary Examiner—Chris K. Moore
Attorney, Agent, or Firm—Barnes & Thornburg

[57] ABSTRACT

A suction cleaner for use in sucking relatively large refuse, the cleaner including a suction chamber, a dust chamber communicating with the suction chamber, the dust chamber including a plurality of edged agitators having first blades, to which a second blade is faced so as to shred the refuse to small pieces, the second blade being retainable either at an operative position or at an inoperative position at which the second blade is kept away from the first blades.

5 Claims, 4 Drawing Sheets

SUCTION CLEANER

BACKGROUND OF THE INVENTION

The present invention relates to a suction cleaner for use in sucking relatively large refuse on roads and gardens, wherein the refuse includes dead leaves and branches scattering on the ground.

Portable suction cleaners are known which comprise a suction duct in a front section and a power vacuum pump in a rear section. The suction duct has a simple hollow construction, so that it is often choked with relatively large refuse such as twigs or rubbish lumps.

The present invention aims at avoiding the choking trouble pointed out above. Thus an object of the present invention is to provide a suction cleaner capable of shredding the sucked refuse to pieces.

Other objects and advantages of the present invention will become more apparent from the following detailed description, when taken in conjunction with the accompanying drawings which show, for the purpose of illustration only, one embodiment in accordance with the present invention.

According to the present invention there is provided a suction cleaner for use in sucking relatively large refuse, the cleaner including a suction chamber, a dust chamber communicating with the suction chamber, the dust chamber including a plurality of edged impellers having first blades, to which a second blade is faced so as to shred the refuse to small pieces, the second blade being retainable either at an operative position or at an inoperative position at which the second blade is kept away from the first blades.

DETAILED DESCRIPTION OF THE INVENTION

Figure 1:
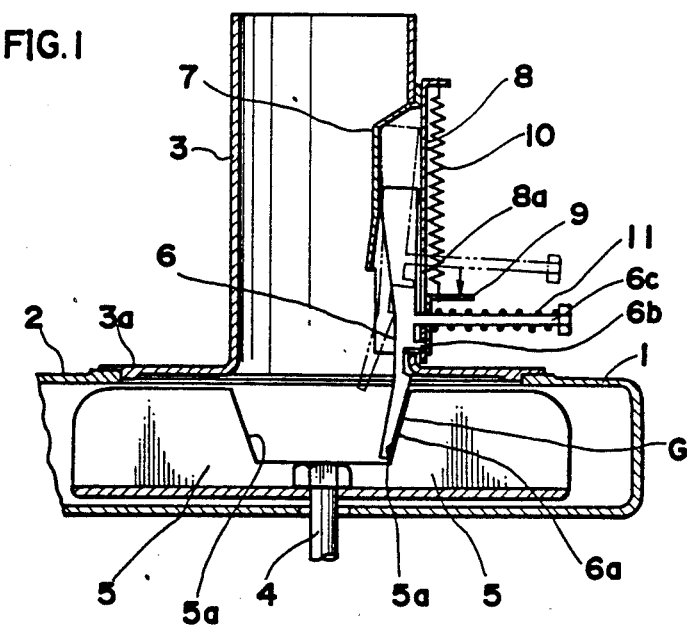
FIG. 1 is a vertical cross-section, partly omitted, through a suction cleaner according to the present invention.
Figure 2:
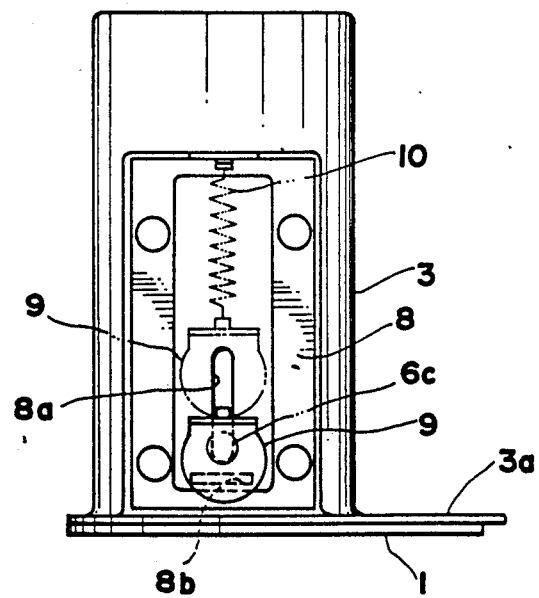
FIG. 2 is a right side view, partly omitted, of the suction cleaner of FIG. 1.
Figure 3:
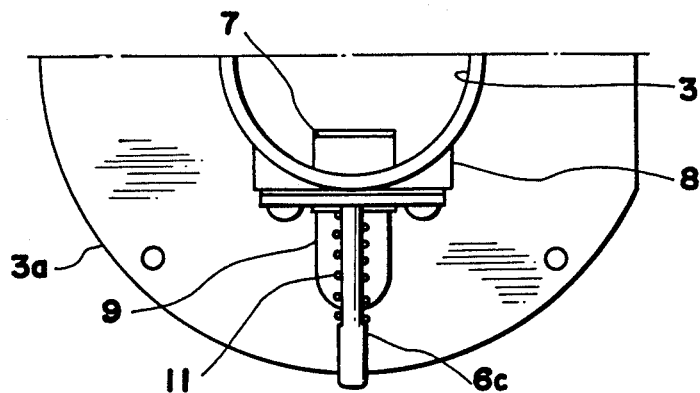
FIG. 3 is a plan view, partly omitted, of the suction cleaner of FIG. 1.
Figure 4:
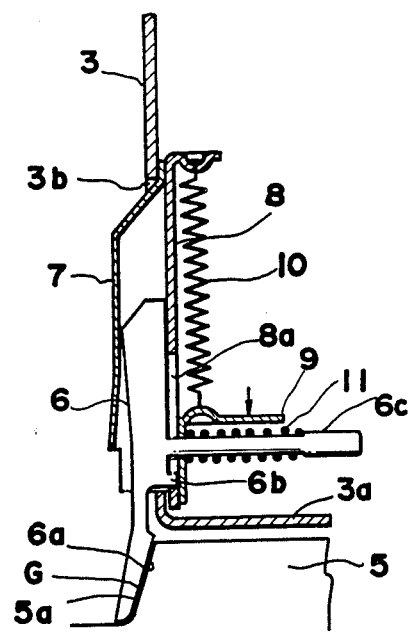
FIG. 4 is a fragmentary side view showing a slightly modified shank.
Figure 5:
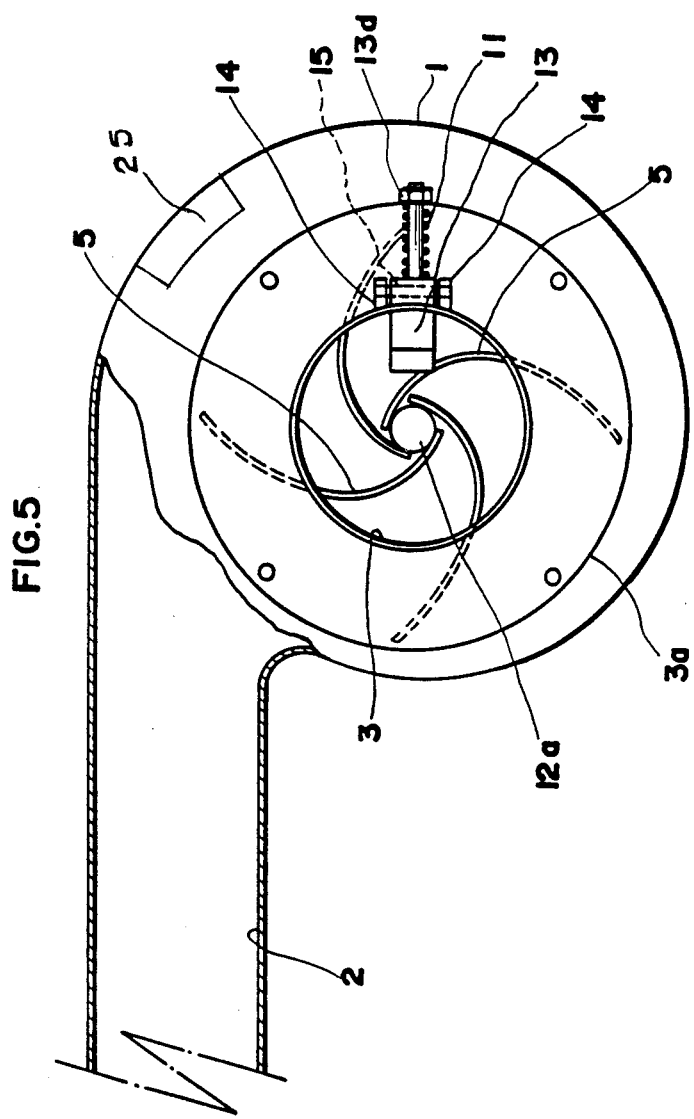
FIG. 5 is a plan view showing a modified version of the embodiment.

Referring to FIGS. 1 to 4 the suction cleaner of the invention has a dust chamber 1 and an outlet duct 2 tangentially connected to the dust chamber 1 (refer to FIG. 5). The dust chamber 1 has an open top end which is covered by a cylindrical suction chamber 3, wherein a ring-shaped flange 3a thereof is fixed to the periphery of the open top end of the dust chamber 1. There are provided edged impellers in the form of rotary vanes 5 mounted in the dust chamber 1. The rotary vanes 5 are radially fixed to a driving shaft 4 projecting into the dust chamber 1. Each rotary vane 5 has an outer side and an inner side, which is formed into a blade 5a as best shown in FIG. 1. Hereinafter these blades 5a will be referred to as rotary blades, as opposed to a stationary blade 6a, which will be described below.

The stationary blade 6a is formed in a lower end portion of a shank 6 toward the rotary vanes 5. The shank 6 is normally located at an operative position at which, as shown in FIG. 1, the stationary blade 6a is juxtaposed the rotary blades 5a with such an adequate gap (G) as to enable both blades 5a and 6a to shred the refuse therebetween. The shank 6 has a protuberance 6b and a ledge 6c supporting a coil spring 11. The suction chamber 3 has a window 3b in which the shank 6 is movably provided. The window 3b is covered with an inner cover 7 and the shank 6 is covered with an outer cover 8 as best shown in FIG. 4. These covers 7 and 8 are fixed to the dust chamber 3. In this way the shank 6 is interlocated between the two covers 7 and 8. The outer cover 8 has a vertically extending slot 8a in which the ledge 6c is movably inserted, and a horizontally extending slit 8b slightly below the vertical slot 8a in which the protuberance 6b is releasably inserted. The ledge 6c is passed through a spring holder 9 for holding a spring 10 whose other end is fixed to an upper portion of the outer cover 8. In this way the ledge 6c is upwardly biased by the spring 10. The spring 11 on the ledge 6c is supported against the spring holder 9. If anything is caught in the blades 5a and 6a, the stationary blade 6a is forced away from the rotary blades 5a against the spring 11 to disengage the protuberance 6b from the slit 8b. As a result, the shank 6 is withdrawn upward from the operative position as shown by phantom lines in FIG. 1. Thus the blades 5a and 6a are protected against breakage.

Figure 6:
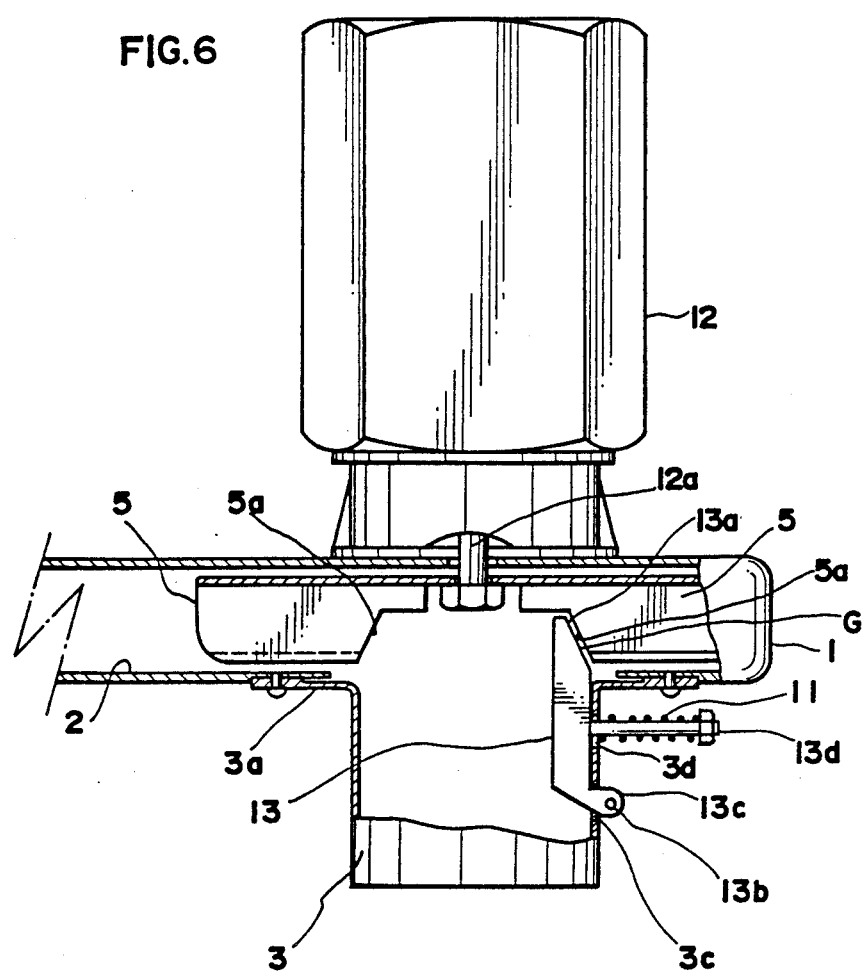
FIG. 6 is a front view showing the suction cleaner of FIG. 5.
Figure 7:
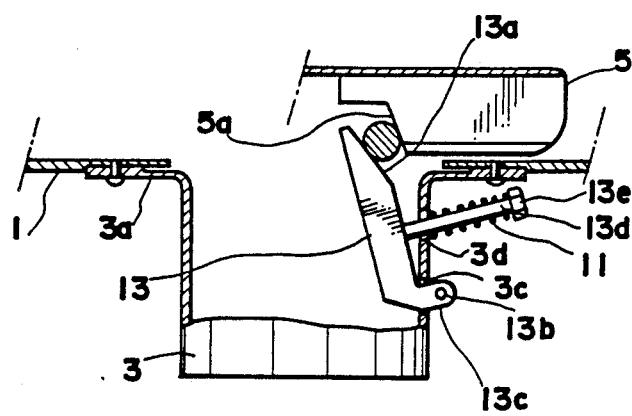
FIG. 7 is a fragmentary view showing a state in which a small object is caught between a rotary blade and a stationary blade.

Referring to FIGS. 5 to 7, a modified version of the embodiment will be described:

The dust chamber 3 is connected to the suction chamber 1 at its bottom. The outlet duct 2 is likewise tangentially connected to the suction chamber 1. The rotary vanes 5 having blades 5a are radially fixed to a driving shaft 12a of a motor 12 mounted on top of the suction chamber 1. The vanes 5 are curved in the direction of rotation. There is provided an L-shaped shank 13 having a short leg 13c and a blade 13a, a ledge 13d supporting the spring 11, and a bent tail portion 13c having a round hole 13b. The ledge 13d and the short leg 13c is inserted in apertures 3d and 3c formed in a wall of the dust chamber 3. The short leg 13c has a round hole 13b through which a flanged pin 15 is passed as shown in FIG. 5. The reference numerals 14 denotes flanges designed to retain the pin 15 in the hole 13b. The ledge 13d supports a spring 11 against the wall of the dust chamber 3. Normally the shank 13 is positioned at an operative position as shown in FIG. 6 with an adequate gap (G) between the two blades 5a and 13a. However if a relatively large object such as a stone is caught in the gap, the shank 13 is angularly displaced as shown in FIG. 7 so that the stationary blade 13a is forced away from the rotary blades 5a. In this way the blades 5a and 13a are protected against breakage.

When the cleaner is switched on, the motor is driven, thereby sucking refuse on a road into the dust chamber through the suction chamber. The refuse is cut to pieces by and between the rotary blades and the stationary blades. The small pieces of refuse are discharged through the outlet duct 2, which is normally provided with a bag for storing the refuse pieces. The cleaner can be loaded with a battery 25, such as, for example, with the battery 25 mounted within the suction chamber as shown in FIG. 5, thereby making it possible to carry the cleaner any place where no source of electricity is available.

What is claimed is:

1. A suction cleaner for use in sucking relatively large refuse, the cleaner comprising:

a dust chamber;

a suction chamber communicating with the dust chamber;

an outlet duct tangentially connected to the dust chamber for letting the refuse out of the dust chamber;

a plurality of edged impellers mounted in the dust chamber for producing suction with the suction chamber, the impellers being fixed to a rotating shaft protruding into the dust chamber;

first blades provided at an inner side of at least one of the impellers;

a second blade formed in a shank provided in the suction chamber, the shank being retainable at one of an operative position at which the second blade is juxtaposed to the first blades with such a gap as to shred the refuse therebetween, and an inoperative position at which the second blade is kept away from the first blades; and drive means for rotating the impellers through the rotating shaft and producing suction within the suction chamber.

2. A suction cleaner as set forth in claim 1, wherein the shank is retained at one of the operative position and the inoperative position by means of a spring.

3. A suction cleaner as set forth in claim 1, wherein the first blades and the second blade are oblique in parallel with each other.

4. A suction cleaner as set forth in claim 1, wherein the suction chamber comprises a window in which the shank is provided, the window being covered by a cover.

5. A suction cleaner as set forth in claim 1, wherein the second blade is moved to the inoperative position when refuse, which cannot be cut by the first and second blades, passes therebetween.

* * * * *